Dec. 3, 1929.  W. MOLLER  1,738,147
ANTISHIMMYING DEVICE
Filed Dec. 3, 1927
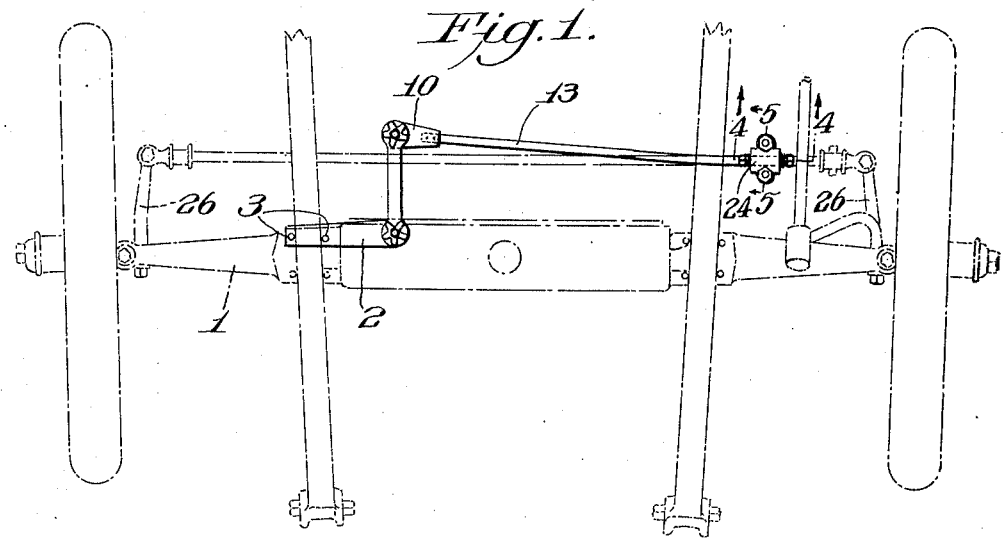

Patented Dec. 3, 1929

1,738,147

UNITED STATES PATENT OFFICE

WILHELM MOLLER, OF UPPER DARBY, PENNSYLVANIA, ASSIGNOR TO FRONT WHEEL CONTROL, INC., OF PHILADELPHIA, PENNSYLVANIA, A CORPORATION OF DELAWARE

ANTISHIMMYING DEVICE

Application filed December 3, 1927. Serial No. 237,537.

The present invention relates to an improved anti-shimmying attachment for the front wheels of a motor vehicle.

Owing to the looseness of play of the various connections in the steering mechanism of a motor vehicle the front wheels vibrate laterally, due to passing over rough road beds, therefore it is the purpose of the present invention to relieve and prevent this lateral vibration or shimmying of the front wheels.

In a previous application which has matured into Patent No. 1,656,566, dated January 17, 1928, there is disclosed a contrivance for preventing lateral vibration or shimmying of the front wheels, said construction being adapted particularly for use in connection with Ford automobiles, but this construction is not necessarily applicable to heavy machines, where the steering mechanism and the associated parts are unlike those of the Ford vehicle, therefore another purpose of the invention is to provide an anti-shimmying device especially adapted for heavy and large cars, and wherein one connection of the device is made with the front axle, and the other connection is made with the cross connecting rod uniting the arms of the knuckle joints between the axle and the front wheels, said connections with the front axle including friction means operating to relieve the shimmying or lateral vibration of the front wheels, and especially in passing over rough road beds.

A further purpose is to provide an improved connection between the anti-shimmying device and the cross connecting rod, so as to take care of any lateral play of a rod forming an element of the anti-shimmying device, thereby enabling the device to operate with accuracy and precision, and enable the operator to actuate the steering mechanism as though the steering mechanism of the automobile was free of such shimmying attachment.

It is to be understood that the particulars herein given are in no way limitive, and that while still keeping within the scope of the invention, any desired modification of details and proportions may be made in the construction of the appliance according to circumstances.

The invention comprises further features and combination of parts to be hereinafter set forth, shown in the drawings and claimed.

In the drawings:

Figure 1—is a plan view of the front construction of an automobile axle, showing the anti-shimmying attachment as applied.

Figure 2—is an enlarged plan view of one end of the attachment where it connects with the axle.

Figure 3—is a sectional view on line 3—3 of Figure 2.

Figure 4—is a sectional view on line 4—4 of Figure 1, showing the mounting and connection of the rod of the anti-shimmying device with the cross connecting rod between the arms of the knuckle joints, illustrating the looseness of play for the rod.

Figure 5—is a cross sectional view on line 5—5 of Figure 1.

Referring to the drawings, 1 identifies the axle of a motor vehicle, the one carrying the front wheels, and 2 denotes a bracket plate, which is fastened at 3 to the axle by means of one of the staples, which fastens the springs to the axle.

This bracket plate has an off-set extension 4 which is interposed between the friction discs 5. The friction discs are arranged on opposite faces of the extension and under the circular ends 6 of the two links 7.

The other ends of the links 7 terminate in circular plates 8 which engage on the remote faces of a pair of friction discs 9, between which is interposed a circular head 10, a reduced extension of which has its end fitting into a slot 12 in the end of a tubular rod 13, there being a welded or other suitable joint at this point.

Passing centrally through the circular ends of the bracket plate and through the friction discs 5 and the circular ends or heads 6 of the links 7 is a bolt 14 having a nut 15, and arranged under the head and the nut of said bolt are washers 15ª having spring arms 16. The washers are centrally dished, so that the ends of the arms 16 will bear on the circular ends of the links 7 and thereby create friction with the circular discs. A bolt 17 passes centrally through the circular ends 8 of the links 7 and through the discs 9 and through the head 10, said bolt having a nut 18. Bearing upon the circular heads 8 are the spring arms 19 of the dished washers 20, which are arranged under the head and nut of the bolt 17, thereby creating friction of the circular ends or heads 8 with the circular head 10 and the friction washers 20, which are interposed between the heads or circular ends 8 and the circular head 10, thereby creating sufficient friction, which together with the friction in the joint with the bracket plate operates to relieve or prevent shimmying or lateral vibration with the front wheels. It is possible to adjust the nuts on the bolts to increase or decrease the friction on the arms of the disc washers with the adjoining parts of the joints.

The other end of the rod (which connects with the arm of the circular head 10) has threaded therein a bolt 21, which passes loosely through an opening 22 formed in a boss 23 carried by one of the parts of a two part clamp 24. This two part clamp 24 clamps with the cross connecting rod, which connects the lateral arms 26 of the knuckle joints between the front axle and the front wheels. Bolts 27 securely connect the two parts of the clamp and thereby secure the clamp to the cross connecting rod. Arranged on opposite sides of the boss and in surrounding relation to the bolt are springs 28, one spring being between the head 29 of the bolt and the boss and the other being between a nut 30 and the boss, the adjustment of the nut acting to regulate the tension of the springs. It is to be noted that the tubular rod has a looseness of play in the opening formed in the boss so as to permit of any lateral play of the tubular rod.

The invention having been set forth, what is claimed is:

The combination with the front axle of a motor vehicle, of a bracket connected to the front axle, links connected to the bracket including friction means, an element connected to the links having friction means with devices for increasing and decreasing the friction of both friction means, a clamp carried by a cross connecting rod which operatively connects the front wheels of a vehicle, said clamp being adjustable and provided with a depending boss having an opening, a bolt passing through the opening of the boss and adjustably threaded into one end of said element, means for locking the bolt in position, and resilient means on each side of the boss and surrounding the bolt, whereby the lateral vibrations of the front wheels may be absorbed.

In testimony whereof he affixes his signature.

WILHELM MOLLER.